(12) United States Patent
Wan

(10) Patent No.: US 11,750,018 B2
(45) Date of Patent: Sep. 5, 2023

(54) DEVICE TO-BE-CHARGED AND CHARGING CONTROL METHOD

(71) Applicant: GUANGDONG OPPO MOBILE TELECOMMUNICATIONS CORP., LTD., Guangdong (CN)

(72) Inventor: Shiming Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 180 days.

(21) Appl. No.: 16/988,709

(22) Filed: Aug. 9, 2020

(65) Prior Publication Data

US 2021/0099006 A1 Apr. 1, 2021

Related U.S. Application Data

(63) Continuation of application No. PCT/CN2018/086914, filed on May 15, 2018.

(51) Int. Cl.
*H01M 10/44* (2006.01)
*H02J 7/04* (2006.01)
(Continued)

(52) U.S. Cl.
CPC ............... *H02J 7/04* (2013.01); *H01M 10/44* (2013.01); *H02J 7/007182* (2020.01); *H02J 50/10* (2016.02); *H04B 5/0037* (2013.01)

(58) Field of Classification Search
CPC ........ H02J 7/04; H02J 50/10; H02J 7/007182; H01M 10/44; H04B 5/0037
See application file for complete search history.

(56) References Cited

U.S. PATENT DOCUMENTS

| 11,075,542 B2 * | 7/2021 | Wan | H02J 7/00 |
| 2008/0036436 A1 * | 2/2008 | Lewis | G05F 1/46 |
| | | | 323/274 |

(Continued)

FOREIGN PATENT DOCUMENTS

| CN | 102510614 | 6/2012 |
| CN | 103107584 | 5/2013 |

(Continued)

OTHER PUBLICATIONS

Texas Instruments "TPS61251 Boost Converter for Battery Backup Charging with Adjustable Constant Current and Snooze Mode", Sep. 2010. (Year: 2010).*

(Continued)

*Primary Examiner* — Drew A Dunn
*Assistant Examiner* — Pamela J Jeppson
(74) *Attorney, Agent, or Firm* — Hodgson Russ LLP

(57) ABSTRACT

Provided are a device to-be-charged and a charging control method. The device to-be-charged can include a wireless receiving circuit, a charging management circuit, and a step-down circuit. The wireless receiving circuit can be configured to receive a wireless charging signal to charge a battery. The charging management circuit can be configured to perform constant voltage control and/or constant current control on charging of the battery. The step-down circuit is configured to decrease an output voltage of the wireless receiving circuit or an output voltage of the charging management circuit.

14 Claims, 3 Drawing Sheets

(51) Int. Cl.
  *H02J 50/10*   (2016.01)
  *H02J 7/00*   (2006.01)
  *H04B 5/00*   (2006.01)

(56) References Cited

U.S. PATENT DOCUMENTS

| | | | | |
|---|---|---|---|---|
| 2010/0084923 | A1* | 4/2010 | Yoshida | H01M 8/0488 |
| | | | | 307/80 |
| 2014/0147157 | A1* | 5/2014 | Hiraguchi | G03G 15/5004 |
| | | | | 399/88 |
| 2014/0152251 | A1 | 6/2014 | Kim et al. | |
| 2014/0239889 | A1* | 8/2014 | Endo | H02J 7/0077 |
| | | | | 320/108 |
| 2014/0268946 | A1 | 9/2014 | Liu | |
| 2015/0162754 | A1* | 6/2015 | Nakano | H02J 50/80 |
| | | | | 307/104 |
| 2016/0118805 | A1* | 4/2016 | Swope | H02J 50/80 |
| | | | | 307/104 |
| 2017/0063140 | A1 | 3/2017 | Lee et al. | |
| 2018/0034305 | A1* | 2/2018 | Lee | H02J 50/10 |

FOREIGN PATENT DOCUMENTS

| | | | | | |
|---|---|---|---|---|---|
| CN | 103107584 | A | * | 5/2013 | ............ Y02E 60/10 |
| CN | 105226745 | | | 1/2016 | |
| CN | 205249551 | | | 5/2016 | |
| CN | 105958581 | | | 9/2016 | |
| CN | 206517089 | | | 9/2017 | |
| CN | 107294172 | A | * | 10/2017 | ............ H01M 10/44 |
| CN | 207150424 | | | 3/2018 | |
| CN | 110100368 | | | 8/2019 | |
| JP | 2001210345 | | | 8/2001 | |
| JP | 2008226594 | | | 9/2008 | |
| JP | 2014104704 | A | | 6/2014 | |
| JP | 2014168365 | A | | 9/2014 | |
| JP | 2016123162 | A | * | 7/2016 | ............ Y02R 90/16 |
| JP | 2016123162 | A | | 7/2016 | |
| JP | 2016123162 | S | | 7/2016 | |
| JP | 2017041967 | A | | 2/2017 | |
| JP | 2017041967 | A | * | 2/2017 | ......... H01M 10/441 |
| JP | 2017099114 | | | 6/2017 | |
| KR | 20140108135 | | | 9/2014 | |

OTHER PUBLICATIONS

Otsu A, JP-2017041967-A Machine Translation, Feb. 2017 (Year: 2017).*
Liu J, CN-103107584-A Machine Translation, May 2013 (Year: 2013).*
Fukae T, JP-2016123162-A Machine Translation, Jul. 2016 (Year: 2016).*
Chen, CN107294172A, machine translation, Oct. 2017 (Year: 2017).*
WIPO, ISR for PCT/CN2018/086914, Nov. 28, 2018.
JPO, Notice of Refusal issued for JP Application No. 2020-547330, dated Nov. 3, 2021.
EPO, Extended European Search Report for EP Application No. 18919132.3, dated Nov. 5, 2020.
IPI, Office Action for IN Application No. 202017035722, dated Jan. 29, 2021.
IPA, Office Action for AU Application No. 2018423401, dated Mar. 12, 2021.
JPO, Office Action for JP Application No. 2020-547330, dated Jun. 3, 2022.
KIPO, Office Action for KR Application No. 10-2020-7026472, dated Jun. 7, 2022.
CNIPA, First Office Action for CN Application No. 201880085732.1, dated Mar. 22, 2023.

* cited by examiner

DEVICE TO-BE-CHARGED AND CHARGING CONTROL METHOD

CROSS REFERENCE TO RELATED APPLICATION(S)

This application is a continuation of International Application No. PCT/CN2018/086914, filed May 15, 2018, the entire disclosure of which is hereby incorporated by reference.

TECHNICAL FIELD

This disclosure relates to the technical field of wireless charging, and more particularly to a device to-be-charged and a charging control method.

BACKGROUND

Currently, in the field of charging, devices to-be-charged are usually charged in a wired charging manner.

Take mobile phones as an example. Currently, the mobile phone is charged mainly in the wired charging manner. When the mobile phone needs to be charged, the mobile phone can be coupled with a power supply device via a charging cable (such as a universal serial bus (USB) cable), and through the charging cable, an output power of the power supply device can be delivered to the mobile phone to charge a battery of the mobile phone.

For the device to-be-charged, the charging cable is needed for wired charging. This will result in complicated operations in a charging preparation stage. Therefore, a wireless charging manner is enjoying increasing popularity among consumers. However, a conventional wireless charging manner is poor in efficiency and thus needs to be improved.

SUMMARY

Implementations provide a device to-be-charged and a charging control method, which can improve charging efficiency of a wireless charging manner.

In a first aspect, a device to-be-charged is provided. The device to-be-charged includes a wireless receiving circuit, a charging management circuit, and a step-down circuit. The wireless receiving circuit is configured to receive a wireless charging signal to charge a battery. The charging management circuit is configured to perform constant voltage control and/or constant current control on charging of the battery. The step-down circuit is configured to decrease an output voltage of the wireless receiving circuit or an output voltage of the charging management circuit.

In a second aspect, a charging control method is provided. The method includes the following. A wireless charging signal is received with a wireless receiving circuit to charge a battery. Perform, with a charging management circuit, constant voltage control and/or constant current control on charging of the battery. An output voltage of the wireless receiving circuit or an output voltage of the charging management circuit is decreased with a step-down circuit.

DETAILED DESCRIPTION

According to conventional wireless charging technology, a power supply device (such as an adaptor) is generally coupled with a wireless charging apparatus (such as a wireless charging base), and via the wireless charging apparatus, an output power of the power supply device is delivered to the device to-be-charged wirelessly (for example, via an electromagnetic wave) for wireless charging of the device to-be-charged.

According to various wireless charging principles, the wireless charging can be in the manner of magnetic coupling (or electromagnetic induction), magnetic resonance, and radio waves. At present, main wireless charging standard includes QI standard, power matters alliance (PMA) standard, and alliance for wireless power (A4WP) standard. Under the QI standard and the PMA standard, magnetic coupling is adopted for wireless charging, and under the A4WP standard, magnetic resonance is adopted for wireless charging.

In the following, a conventional wireless charging manner will be described in connection with FIG. 1.

Figure 1:
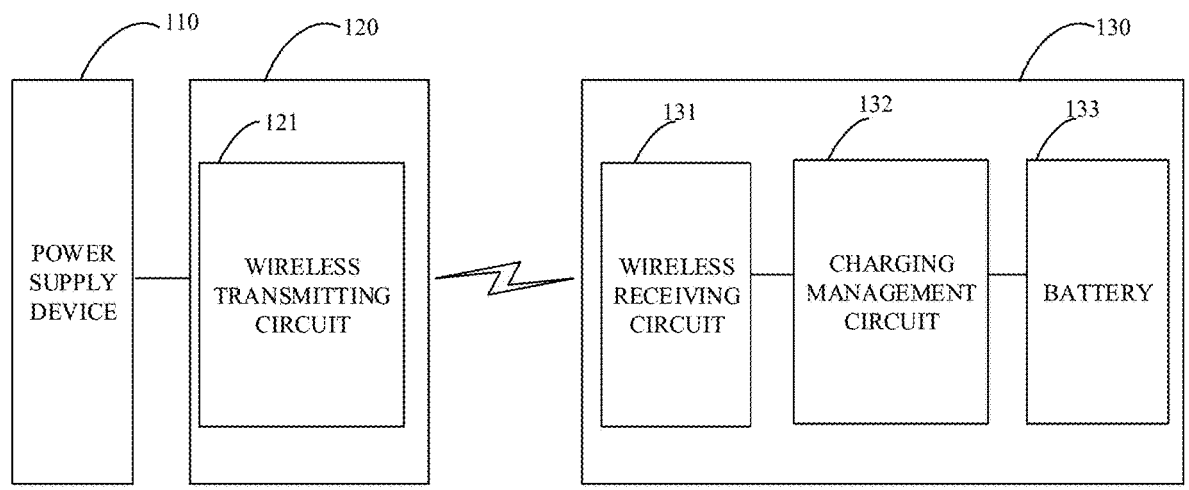
FIG. 1 is a schematic diagram of a conventional wireless charging system.

As illustrated in FIG. 1, a wireless charging system includes a power supply device 110, a wireless charging apparatus 120, and a device to-be-charged 130. The wireless charging apparatus 120 can be, for example, a wireless charging base. The device to-be-charged 130 can be, for example, a terminal.

After the power supply device 110 is coupled with the wireless charging apparatus 120, an output voltage and an output current of the power supply device 110 can be transmitted to the wireless charging apparatus 120.

The wireless charging apparatus 120 can convert, via an internal wireless transmitting circuit 121, the output voltage and the output current of the power supply device 110 into a wireless charging signal (electromagnetic signal) for transmission. For example, the wireless transmitting circuit 121 can convert the output current of the power supply device 110 into an alternating current (AC) and convert the AC into the wireless charging signal via a transmitting coil or a transmitting antenna (not illustrated in FIG. 1).

The device to-be-charged can include but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of the mobile terminal may include, but are not limited to, a satellite or cellular telephone, a personal communication system (PCS) terminal capable of cellular radio telephone, data processing, fax, and data communication, a personal digital assistant (PDA) equipped with radio telephone, pager, Internet/Intranet access, web browsing, notebook, calendar, and/or global positioning system (GPS) receiver, and/or other electronic devices equipped with radio telephone receiver such as a conventional laptop or a handheld receiver. In some examples, the device to-be-charged may be a mobile terminal or a handheld terminal device, such as mobile phone, iPad, etc. In some examples, the device to-be-charged may be a system-on-chip, and a battery of the device to-be-charged may or may not belong to the system-on-chip.

The device to-be-charged 130 can receive, via a wireless receiving circuit 131, the wireless charging signal from the wireless transmitting circuit 121 and convert the wireless charging signal into an output voltage and an output current of the wireless receiving circuit 131. For example, the wireless receiving circuit 131 can convert the wireless charging signal transmitted by the wireless transmitting circuit 121 into an AC via a receiving coil or a receiving antenna (not illustrated in FIG. 1) and rectify and/or filter the AC to be converted into the output voltage and the output current of the wireless receiving circuit 131.

As to the conventional wireless charging technology, before wireless charging begins, the wireless charging apparatus 120 and the device to-be-charged 130 will negotiate a transmission power of the wireless transmitting circuit 121. When such power negotiated between the wireless charging apparatus 120 and the device to-be-charged 130 is 5 W (watt) for example, the output voltage and the output current of the wireless receiving circuit 131 are respectively 5V (volt) and 1 A (ampere) in general. When the power negotiated between the wireless charging apparatus 120 and the device to-be-charged 130 is 10.8 W for example, the output voltage and the output current of the wireless receiving circuit 131 are respectively 9V and 1.2 A in general.

The output voltage of the wireless receiving circuit 131 is however not suitable to be directly applied to a battery 133. Instead, the output voltage needs to be subjected to constant voltage control and/or constant current control performed by a charging management circuit 132 of the device to-be-charged 130 to obtain an expected charging voltage and/or an expected charging current of the battery 133 of the device to-be-charged 130.

The charging management circuit 132 can be configured to convert the output voltage of the wireless receiving circuit 131 to meet requirements on the expected charging voltage and/or the expected charging current of the battery 133.

As an example, the charging management circuit 132 can be a charging integrated circuit (IC) (or referred to as charger). During charging of the battery 133, the charging management circuit 132 is configured to manage a charging voltage and/or a charging current applied to the battery 133. The charging management circuit 132 can have at least one of a voltage feedback function and a current feedback function to achieve management of at least one of the charging voltage and the charging current applied to the battery 133 respectively.

For example, a charging process of the battery can include at least one of a trickle charging stage, a constant-current charging stage, and a constant-voltage charging stage. In the trickle charging stage, the charging management circuit 132 can utilize the current feedback function to make current flowing into the battery 133 in the trickle charging stage satisfy the expected charging current of the battery 133 (such as a first charging current). In the constant-current charging stage, the charging management circuit 132 can utilize the current feedback function to make current flowing into the battery 133 in the constant-current charging stage satisfy the expected charging current of the battery 133 (such as a second charging current, which may be larger than the first charging current). In the constant-voltage charging stage, the charging management circuit 132 can utilize the voltage feedback function to make voltage applied to the battery 133 in the constant-voltage charging stage satisfy the expected charging voltage of the battery 133.

As one example, when the output voltage of the wireless receiving circuit 131 is higher than the expected charging voltage of the battery 133, the charging management circuit 132 can be configured to decrease (that is, step down) the output voltage of the wireless receiving circuit 131 to make decreased charging voltage meet requirements on the expected charging voltage of the battery 133. As another example, when the output voltage of the wireless receiving circuit 131 is lower than the expected charging voltage of the battery 133, the charging management circuit 132 can be configured to increase (that is, step up) the output voltage of the wireless receiving circuit 131 to make increased charging voltage meet requirements on the expected charging voltage of the battery 133.

For example, the output voltage of the wireless receiving circuit 131 is a constant 5V. When the battery 133 includes a single cell (here, a lithium battery is taken as an example of the cell, and a charging cut-off voltage of a single lithium battery cell is generally 4.2V), the charging management circuit 132 (such as a Buck circuit) can decrease the output voltage of the wireless receiving circuit 131 to make the decreased charging voltage meet requirements on the expected charging voltage of the battery 133.

For another example, the output voltage of the wireless receiving circuit 131 is a constant 5V. When the battery 133 includes two or more single-cells coupled in series (here, a lithium battery is taken as an example of the cell, and a charging cut-off voltage of a single lithium battery cell is generally 4.2V), the charging management circuit 132 (such as a Boost circuit) can increase the output voltage of the wireless receiving circuit 131 to make the increased charging voltage meet requirements on the expected charging voltage of the battery 133.

Due to low power conversion efficiency (also referred to as energy conversion efficiency or circuit conversion efficiency) of the charging management circuit 132, unconverted electrical energy may dissipate as heat, and such heat will accumulate inside the device to-be-charged 130. In addition, design space and heat dissipation space of the device to-be-charged 130 are both very small (for example, mobile terminals are becoming lighter and thinner in physical size, and at the same time, a large number of electronic components are densely arranged inside the mobile terminal to improve performance of the mobile terminal). This not only makes design of the charging management circuit 132 more difficult, but also makes it difficult to promptly remove heat accumulated inside the device to-be-charged 130, which can cause the device to-be-charged 130 to malfunction.

For example, heat accumulated in the charging management circuit 132 may cause heat interference on electronic components near the charging management circuit 132, which can result in malfunction of the electronic components. In another example, heat accumulated in the charging management circuit 132 may shorten the service life of the charging management circuit 132 and the service life of the electronic components near the charging management circuit 132. As another example, heat accumulated in the charging management circuit 132 may cause heat interference on the battery 133, which thus leads to abnormal charging and discharging of the battery 133. In yet another example, heat accumulated in the charging management circuit 132 may result in rise in temperature of the device to-be-charged 130 and therefore affects user experience when the device to-be-charged 130 is in use during charging. In another example, heat accumulated in the charging management circuit 132 may cause the charging management circuit 132 to short circuit, and as a result, the output voltage of the wireless receiving circuit 131 may be directly applied to the battery 133, thus causing a charging abnormality. If the battery 133 is overcharged for a long time, it may even cause the battery 133 to explode, endangering the user's safety.

In addition, in order to increase charging speed, an increasing number of devices to-be-charged are charged with low voltage and large current. However, charging with large current will result in a large amount of heat accumulated at the wireless receiving circuit 131. As an example, a charging power is 20 W, and a single cell has a charging voltage of 5V and a charging current of 4 A. In this situation, the wireless transmitting circuit 121 can generate a wireless charging signal based on the charging voltage of 5V and the charging current of 4 A. Accordingly, the wireless receiving circuit 131 converts the wireless charging signal into an output voltage of 5V and an output current of 4 A. Such charging current of 4 A will result in a large amount of heat generated during electrical energy transmission between the wireless transmitting circuit 121 and the wireless receiving circuit 131.

In order to reduce heating of the device to-be-charged, the wireless charging signal can be transmitted with high voltage. Still taking above as an example, in which the charging power is 20 W, and the single cell has the charging voltage of 5V and the charging current of 4 A, the wireless transmitting circuit 121 can generate the wireless charging signal based on a voltage of 10V and a current of 2 A. Accordingly, the wireless receiving circuit 131 converts the wireless charging signal into an output voltage of 10V and an output current of 2 A. Compared with the example described above, by increasing the voltage with the charging power remaining constant, the output current of the wireless receiving circuit 131 can be decreased from 4 A to 2 A. As such, it is possible to effectively reduce heat generation of the wireless receiving circuit 131. In addition, in order to make the charging voltage and/or the charging current applied to the battery 133 satisfy charging requirements of 5V/4 A, the output voltage of the wireless receiving circuit 131 can be decreased with the charging management circuit 132, such that the charging voltage and/or the charging current applied to the battery 133 remains 5V/4 A. In this way, a step-down conversion efficiency (or energy loss during step-down conversion) of the charging management circuit 132 becomes a critical factor in heat generation of the device to-be-charged 130.

In general, a larger voltage difference between an input voltage and an output voltage of the charging management circuit 132 leads to a lower step-down conversion efficiency as well as more serious heating. Wireless charging signal transmission with high voltage will certainly result in a large voltage difference between the input voltage and the output voltage of the charging management circuit 132. Therefore, in this case, there is a need to further improve the internal structure of the device to-be-charged if it is still desirable to transmit a wireless charging signal with high voltage.

In the following, a device to-be-charged according to implementations will be described in connection with FIG. 2, which is possible to further reduce heating of the device to-be-charged while transmitting a wireless charging signal with high voltage.

Figure 2:
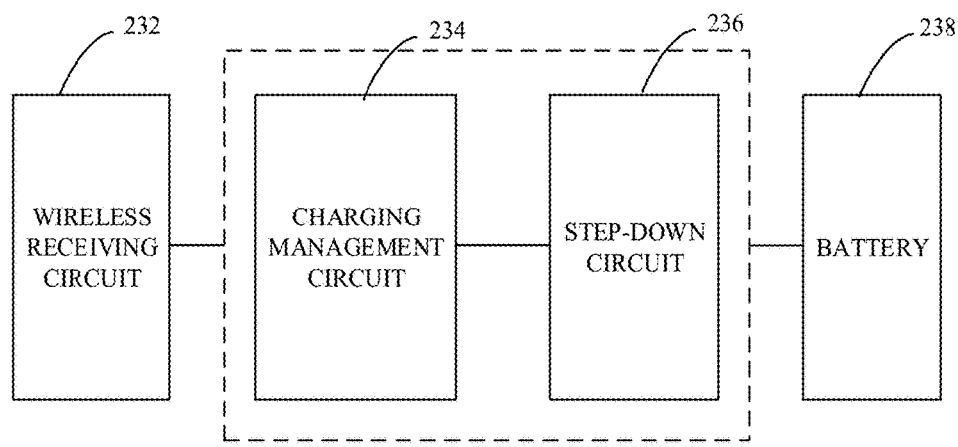
FIG. 2 is a schematic structural diagram of a device to-be-charged according to implementations.

As illustrated in FIG. 2, a device to-be-charged 230 includes a wireless receiving circuit 232, a charging management circuit 234, and a step-down circuit 236.

The wireless receiving circuit 232 is configured to receive a wireless charging signal to charge a battery 238. The wireless receiving circuit 232 may include, for example, a receiving coil or receiving antenna (not illustrated in FIG. 2) and a shaping circuit (such as a rectifying circuit and/or a filtering circuit) that is coupled with the receiving coil or receiving antenna. The receiving coil or receiving antenna can be configured to convert the wireless charging signal into an AC. The shaping circuit is configured to convert the AC into an output voltage and an output current of the wireless receiving circuit 232.

The charging management circuit 234 is configured to perform constant voltage control and/or constant current control on charging of the battery 238. For example, the charging management circuit 234 has an output end directly coupled with the battery 238. In this case, the charging management circuit 234 can directly convert an output voltage and/or an output current thereof into a charging voltage and/or a charging current currently required by the battery 238, to achieve constant voltage control and/or constant current control on charging of the battery 238. For another example, the output end of the charging management circuit 234 is indirectly coupled with the battery 238 via another circuit (such as the step-down circuit 236 that will be hereinafter described). In this case, the charging management circuit 234 can control the output voltage and/or the output current thereof, such that the charging voltage and/or the charging current currently required by the battery 238 can be obtained after the output voltage and/or the output current of the charging management circuit 234 passes through the another circuit, to achieve constant voltage control and/or constant current control on charging of the battery 238.

The step-down circuit 236 is configured to decrease the output voltage of the wireless receiving circuit 232 or the output voltage of the charging management circuit 234. With aid of the step-down circuit 236, a step-down function of the charging management circuit 234 and a constant voltage control and/or constant current control function of the charging management circuit 234 can be separated to some extent, which can reduce the amount of heat generated by the charging management circuit 234.

In some implementations, the step-down circuit 236 has a higher step-down conversion efficiency than the charging management circuit 234 (or a step-down circuit in the charging management circuit 234, such as a buck circuit). The step-down conversion efficiency can be indicative of energy loss during step-down conversion. The expression that "the step-down circuit 236 has a higher step-down conversion efficiency than the charging management circuit 234" can include the following. Energy loss (or power loss) of the step-down circuit 236 is lower than that of the charging management circuit 234 under the same step-down condition. If the buck circuit is used for step-down conversion in the charging management circuit 234, the expression that "the step-down circuit 236 has a higher step-down conversion efficiency than the charging management circuit 234" may include the following. The step-down circuit 236 has a higher step-down conversion efficiency than the buck circuit in the charging management circuit 234.

As pointed above, in the wireless charging signal transmission with high voltage, it is necessary to decrease the output voltage of the wireless receiving circuit by a large amount. If the charging management circuit is directly adopted to decrease the output voltage of the wireless receiving circuit, due to low step-down conversion efficiency of the charging management circuit, energy loss is high during step-down conversion, which makes heating of the charging management circuit more serious. According to implementations herein, the output voltage of the wireless receiving circuit is decreased not by completely relying on the charging management circuit. Instead, part or all of the step-down function of the charging management circuit is shared by the step-down circuit that has a relatively high step-down conversion efficiency, such that the charging management circuit can perform constant voltage control and/or constant current control within a relatively small voltage range, thus reducing heating of the device to-be-charged.

There is no particular restriction on the form of the step-down circuit 236 in implementations, as long as the step-down conversion efficiency of the step-down circuit 236 is higher than that of the charging management circuit 234. In some implementations, the charging management circuit 234 may be an inductive step-down circuit for step-down conversion, and the step-down circuit 236 may be a capacitive step-down circuit (such as a charge pump) for step-down conversion. Alternatively, the step-down circuit 236 may be a combination of an inductive step-down circuit and a capacitive step-down circuit.

As an example, the step-down circuit 236 is a charge pump. Since the charge pump is mainly composed of switch components, energy loss is low during step-down conversion, which is possible to improve step-down conversion efficiency. There is no particular restriction on the step-down factor (that is, a ratio of an output voltage to an input voltage) of the charge pump in implementations. The step-down factor of the charge pump can be set according to actual needs, for example, the step-down factor can be at least one of ½, ⅓, ⅔, ¼, and the like.

In some implementations, an input voltage of the charging management circuit 234 is higher than the output voltage of the charging management circuit 234. In other words, during step-down conversion of the output voltage of the wireless receiving circuit 232 into the charging voltage currently required by the battery 238, the charging management circuit 234 can be responsible for part of a step-down operation, and the remaining part of the step-down operation is performed by the step-down circuit 236 that has a relatively high step-down conversion efficiency. For example, the charging management circuit 234 performs a minor part of the step-down operation, and accordingly the step-down circuit 236 performs the remaining major part of the step-down operation. That is, the step-down circuit 236 has a larger step-down voltage difference than the charging management circuit 234. Since the step-down circuit 236 has a relatively high step-down conversion efficiency, by allocating the step-down operation in the manner above, it is possible to achieve further reduction in heating of the device to-be-charged.

The positional relationship between the charging management circuit 234 and the step-down circuit 236 is not specifically restricted in implementations, which will be exemplified below with reference to FIG. 3 and FIG. 4.

Figure 3:
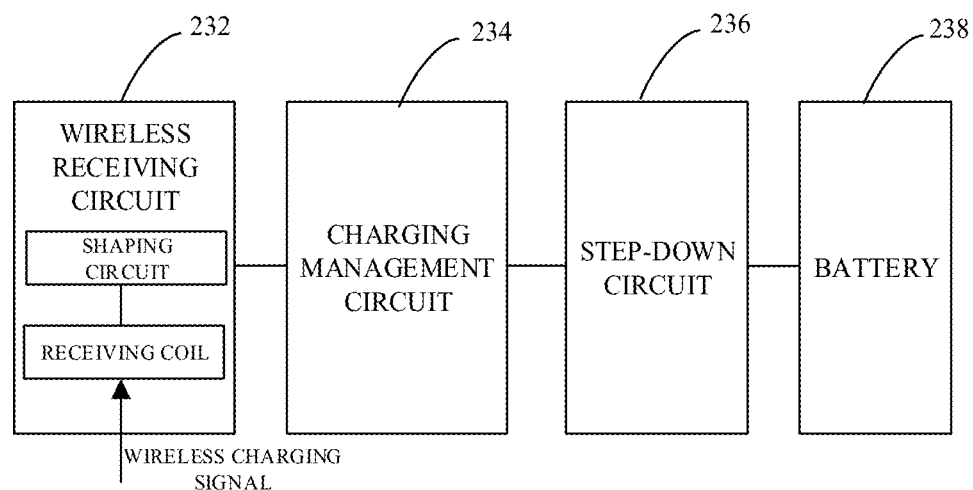
FIG. 3 is a schematic structural diagram of a device to-be-charged according to other implementations.

As illustrated in FIG. 3, the charging management circuit 234 has an input end electrically coupled with an output end of the wireless receiving circuit 232. The charging management circuit 234 is configured to perform constant voltage control and/or constant current control on charging of the battery 238 according to the output voltage of the wireless receiving circuit 232. The step-down circuit 236 has an input end electrically coupled with an output end of the charging management circuit 234 and has an output end electrically coupled with the battery 238. The step-down circuit 236 is configured to decrease the output voltage of the charging management circuit 234 and apply the decreased voltage to the battery 238 for charging.

As an example, the step-down circuit 236 is a half-voltage circuit (which has a step-down factor of ½). The charging management circuit 234 can adjust the output voltage thereof, that is, perform constant voltage control and/or constant current control on the output voltage thereof, such that the output voltage of the charging management circuit 234 is about twice the charging voltage currently required by the battery 238 and thus an output voltage of the half-voltage circuit matches the charging voltage currently required by the battery.

In implementations illustrated in FIG. 3, the charging management circuit 234 can sample the output voltage and/or the output current thereof and perform constant voltage control and/or constant current control on charging of the battery based on the sampled output voltage and/or the sampled output current. Alternatively, the charging management circuit 234 can sample a charging voltage and/or a charging current applied to the battery 238 and perform constant voltage control and/or constant current control on charging of the battery based on the sampled charging voltage and/or the sampled charging current. Alternatively, the charging management circuit 234 can perform constant voltage control and/or constant current control on charging of the battery by adopting any other voltage sampling/current sampling manners, which is not limited herein.

Based on implementations illustrated in FIG. 3, in some implementations, the charging management circuit 234 and the wireless receiving circuit 232 can be integrated into one wireless charging chip. As such, it is possible to improve integration of the device to-be-charged 230 and simplify the structure of the device to-be-charged 230. For example, functions of a conventional wireless charging chip can be extended, such that the conventional wireless charging chip can support a charging management function.

One possible positional relationship between the charging management circuit 234 and the step-down circuit 236 has been described with reference to FIG. 3. Another possible positional relationship between the charging management circuit 234 and the step-down circuit 236 will be given below with reference to FIG. 4. Different from implementations illustrated in FIG. 3, in implementations illustrated in FIG. 4, the step-down circuit 236 is arranged between the wireless receiving circuit 232 and the charging management circuit 234.

Figure 4:
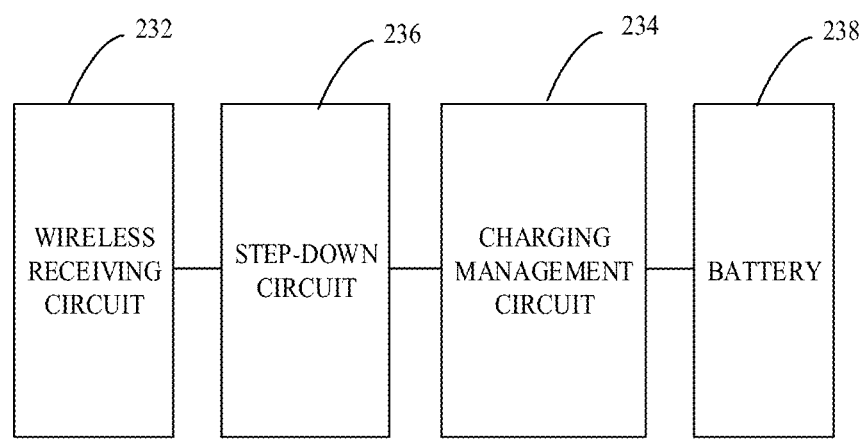
FIG. 4 is a schematic structural diagram of a device to-be-charged according to other implementations.

As illustrated in FIG. 4, in some implementations, the step-down circuit 236 has an input end electrically coupled with an output end of the wireless receiving circuit 232. The step-down circuit 236 is configured to decrease the output voltage of the wireless receiving circuit 232 to obtain a decreased voltage. The charging management circuit 234 has an input end electrically coupled with an output end of the step-down circuit 236 and has an output end electrically coupled with the battery 238. The charging management circuit 234 is configured to perform constant voltage control and/or constant current control on charging of the battery 238 according to the decreased voltage.

The battery 238 according to implementations may include one single cell or multiple cells coupled in series. As an example, a charging power is equal to 20 W, and a charging voltage applied to a single cell is equal to 5V. When the battery 238 includes two cells coupled in series, in order to meet charging voltage requirements of the two cells coupled in series, a charging voltage applied to the battery 238 needs to be maintained at 10V, and accordingly an input voltage of the step-down circuit 236 needs to be higher than 10V. In this way, compared with a single-cell scheme, under the same charging power, the output current of the wireless receiving circuit 232 will be smaller and as such, the amount of heat generated by the wireless receiving circuit 232 will be reduced. Therefore, under the same charging power, by adopting multiple cells coupled in series, heating of the device to-be-charged can be further reduced.

Figure 5:
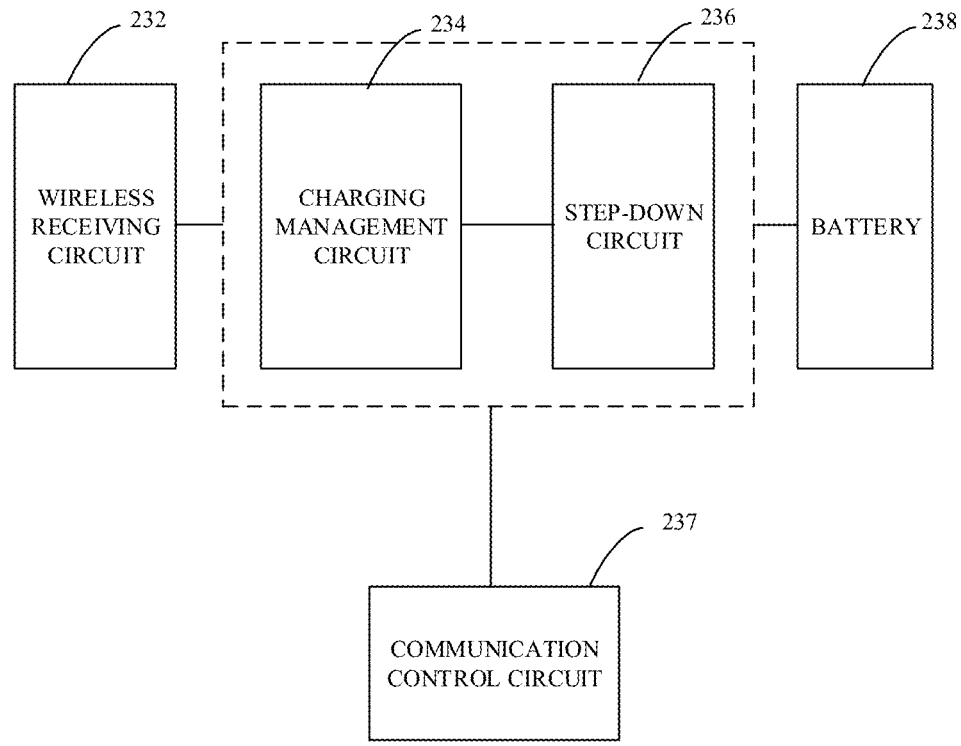
FIG. 5 is a schematic structural diagram of a device to-be-charged according to other implementations.

In some implementations, as illustrated in FIG. 5, the device to-be-charged 230 further includes a communication control circuit 237. The communication control circuit 237 is configured to perform wireless communication with a wireless charging apparatus according to a voltage difference between the input voltage of the charging management circuit 234 and the output voltage of the charging management circuit 234 (hereinafter, "voltage difference of the charging management circuit 234" for short), to instruct the wireless charging apparatus to adjust the wireless charging signal to decrease the voltage difference of the charging management circuit 234.

A step-down conversion efficiency of the charging management circuit 234 is positively correlated to the voltage difference between the input end and the output end of the charging management circuit 234. Therefore, by decreasing the voltage difference of the charging management circuit 234, it is possible to further reduce heating of the charging management circuit 234, thereby further reducing heating of the device to-be-charged 230.

The communication control circuit 237 can detect or monitor in real time the voltage difference of the charging management circuit 234. The communication control circuit 237 can detect or monitor in real time the voltage difference of the charging management circuit 234 in various manners. For example, the communication control circuit 237 can detect the voltage difference of the charging management circuit 234 via a voltage detecting circuit or in other manners. This disclosure is not limited in this regard.

Control functions of the communication control circuit 237 may be implemented by, for example, a micro control unit (MCU) or an application processor (AP) of the device to-be-charged 230, or may be implemented cooperatively by the MCU and the AP.

The manner of communication between the communication control circuit 237 and the wireless charging apparatus is not particularly limited herein. For example, wireless communication can be performed based on Bluetooth, wireless fidelity (Wi-Fi), or backscatter modulation (or power load modulation).

There is no particular restriction on the sequence of communication between the communication control circuit 237 and the wireless charging apparatus in implementations. For example, the communication control circuit 237 can initiate the communication, to instruct the wireless charging apparatus to adjust the wireless charging signal to decrease the voltage difference of the charging management circuit 234. Alternatively, the wireless charging apparatus can initiate the communication, to inquire the communication control circuit 237 whether the wireless charging apparatus needs to decrease the voltage difference of the charging management circuit 234. If there is a need to decrease the voltage difference of the charging management circuit 234, the communication control circuit 237 can respond to the inquiry of the wireless charging apparatus to instruct the wireless charging apparatus to decrease the voltage difference of the charging management circuit 234.

The manner of adjusting the wireless charging signal is not specifically limited in implementations. For example, the wireless charging apparatus can adjust the wireless charging signal by adjusting an input voltage and/or an input current of a wireless transmitting circuit. Alternatively, the wireless charging apparatus can adjust the wireless charging signal by adjusting, through frequency modulation (FM) or duty cycle adjustment, an amount of power drawn by the wireless transmitting circuit from a power provided by a power supply circuit.

The input voltage and/or the input current of the wireless transmitting circuit can be adjusted in various manners. For example, the wireless transmitting circuit can be directly coupled with the power supply circuit. In this situation, the wireless charging apparatus can adjust an output voltage and/or an output current of the power supply circuit to adjust the input voltage and/or the input current of the wireless transmitting circuit. For another example, the wireless charging apparatus is provided with a voltage converting circuit. The voltage converting circuit has an input end coupled with a power supply device and has an output end coupled with the wireless transmitting circuit. The voltage converting circuit can adjust an input voltage of the power supply device to adjust the input voltage and/or the input current of the wireless transmitting circuit.

Apparatus/device implementations have been elaborated above with reference to FIG. 2 to FIG. 5. Method implementations will be hereinafter elaborated with reference to FIG. 6. Method implementations and apparatus/device implementations correspond to each other. Therefore, for the part not described in detail, reference can be made to the foregoing apparatus/device implementations.

Figure 6:
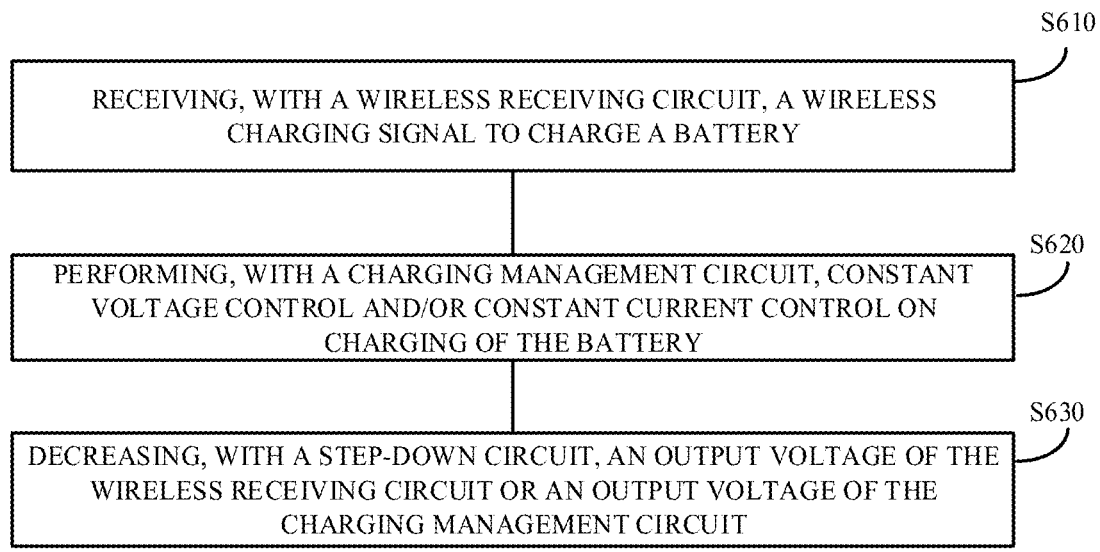
FIG. 6 is a schematic flowchart of a charging control method according to implementations.

FIG. 6 is a schematic flowchart of a charging control method according to implementations. The method is applicable to a device to-be-charged, such as the device to-be-charged 230 described above. The method illustrated in FIG. 6 includes operations at blocks S610 to S630.

At block S610, a wireless charging signal is received with a wireless receiving circuit to charge a battery. At block S620, perform, with a charging management circuit, constant voltage control and/or constant current control on charging of the battery. At block S630, an output voltage of the wireless receiving circuit or an output voltage of the charging management circuit is decreased with a step-down circuit.

In some implementations, the charging management circuit has an input end electrically coupled with an output end of the wireless receiving circuit. The step-down circuit has an input end electrically coupled with an output end of the charging management circuit and has an output end electrically coupled with the battery. Operations at block S620 include performing constant voltage control and/or constant current control on charging of the battery according to the output voltage of the wireless receiving circuit. Operations at block S630 include decreasing the output voltage of the charging management circuit. The method of FIG. 0.6 further includes applying a decreased voltage to the battery for charging.

In some implementations, the step-down circuit has an input end electrically coupled with an output end of the wireless receiving circuit. The charging management circuit has an input end electrically coupled with an output end of the step-down circuit and has an output end electrically coupled with the battery. Operations at block S630 include decreasing the output voltage of the wireless receiving circuit to obtain a decreased voltage. Operations at block S620 include performing constant voltage control and/or constant current control on charging of the battery according to the decreased voltage.

In some implementations, the step-down circuit is a charge pump.

In some implementations, an input voltage of the charging management circuit is higher than the output voltage of the charging management circuit.

In some examples, the battery of the device to-be-charged includes multiple cells coupled in series.

In some implementations, a voltage difference between the input voltage of the charging management circuit and the output voltage of the charging management circuit ("voltage difference of the charging management circuit" for short) is smaller than a voltage difference between an input voltage of the step-down circuit and the output voltage of the step-down circuit.

In some implementations, the method further includes performing wireless communication with a wireless charging apparatus according to the voltage difference of the charging management circuit, to instruct the wireless charging apparatus to adjust the wireless charging signal to decrease the voltage difference of the charging management circuit.

In some implementations, the step-down circuit has a higher step-down conversion efficiency than the charging management circuit.

In some implementations, a ratio of the output voltage of the step-down circuit to the input voltage of the step-down circuit is 1:2, 1:3, 2:3, or 1:4.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a DSL, etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device to-be-charged, comprising:
    a wireless receiving circuit configured to receive a wireless charging signal to charge a battery;
    a charging management circuit configured to perform constant voltage control and/or constant current control on charging of the battery;
    a step-down circuit configured to decrease an output voltage of the charging management circuit; and
    a communication control circuit configured to perform wireless communication with a wireless charging apparatus according to the voltage difference between the input voltage of the charging management circuit and the output voltage of the charging management circuit, to instruct the wireless charging apparatus to adjust the wireless charging signal to decrease the voltage difference of the charging management circuit.

2. The device to-be-charged of claim 1, wherein the charging management circuit has an input end electrically coupled with an output end of the wireless receiving circuit, and the charging management circuit is configured to perform constant voltage control and/or constant current control on charging of the battery according to the output voltage of the wireless receiving circuit; and wherein the step-down circuit has an input end electrically coupled with an output end of the charging management circuit and has an output end electrically coupled with the battery, and the step-down circuit is configured to decrease the output voltage of the charging management circuit and apply a decreased voltage to the battery for charging.

3. The device to-be-charged of claim 1, wherein the charging management circuit is configured to convert at least one of the output voltage and an output current thereof into at least one of a charging voltage and a charging current currently required by the battery.

4. The device to-be-charged of claim 2, wherein the charging management circuit and the wireless receiving circuit are integrated into one wireless charging chip.

5. The device to-be-charged of claim 1, wherein an input voltage of the charging management circuit is higher than the output voltage of the charging management circuit.

6. The device to-be-charged of claim 1, wherein the step-down circuit has a higher step-down conversion efficiency than the charging management circuit.

7. The device to-be-charged of claim 1, wherein a ratio of the output voltage of the step-down circuit to the input voltage of the step-down circuit is 1:2, 1:3, 2:3, or 1:4.

8. The device to be charged of claim 1, wherein the charging management circuit is configured to perform constant voltage control and/or constant current control on charging of the battery by one of:

sampling at least one of an output voltage and an output current of the charging management circuit; and sampling at least one of a charging voltage and charging current applied to the battery.

9. The device to be charged of claim 1, wherein the wireless receiving circuit comprises:

a receiving coil configured to receive the wireless charging signal and convert the wireless charging signal into an alternating current; and a shaping circuit configured to convert the alternating current into at least one of the output voltage and an output current of the wireless receiving circuit.

10. A charging control method, comprising:

receiving, with a wireless receiving circuit, a wireless charging signal to charge a battery;

performing, with a charging management circuit, constant voltage control and/or constant current control on charging of the battery;

decreasing, with a step-down circuit, an output voltage of the charging management circuit; and performing wireless communication with a wireless charging apparatus according to the voltage difference between the input voltage of the charging management circuit and the output voltage of the charging management circuit, to instruct the wireless charging apparatus to adjust the wireless charging signal to decrease the voltage difference of the charging management circuit.

11. The method of claim 10, wherein the charging management circuit has an input end electrically coupled with an output end of the wireless receiving circuit, and the step-down circuit has an input end electrically coupled with an output end of the charging management circuit and has an output end electrically coupled with the battery;

wherein performing constant voltage control and/or constant current control on charging of the battery comprises performing constant voltage control and/or constant current control on charging of the battery according to the output voltage of the wireless receiving circuit;

wherein decreasing the output voltage of the wireless receiving circuit or the output voltage of the charging management circuit comprises decreasing the output voltage of the charging management circuit; and wherein the method further comprises applying a decreased voltage to the battery for charging.

12. The method of claim 10, wherein an input voltage of the charging management circuit is higher than the output voltage of the charging management circuit.

13. The method of claim 10, wherein a voltage difference between the input voltage of the charging management circuit and the output voltage of the charging management circuit is smaller than a voltage difference between an input voltage of the step-down circuit and the output voltage of the step-down circuit.

14. The method of claim 10, wherein receiving, with the wireless receiving circuit, the wireless charging signal to charge the battery comprises:

converting, with a receiving coil, the wireless charging signal received into an alternating current; and converting, with a shaping circuit, the alternating current into at least one of the output voltage and an output current of the wireless receiving circuit.

\* \* \* \* \*